Nov. 26, 1963  S. J. FRITZ  3,111,808
THRUSTER
Filed Aug. 20, 1962

INVENTOR
Stewart J. Fritz
BY Cushman, Darby & Cushman
ATTORNEYS

United States Patent Office 3,111,808
Patented Nov. 26, 1963

3,111,808
THRUSTER
Stewart J. Fritz, Scottsdale, Ariz., assignor to Rocket Power, Inc., Mesa, Ariz., a corporation of Arizona
Filed Aug. 20, 1962, Ser. No. 217,797
7 Claims. (Cl. 60—26.1)

This invention relates to a thruster and more particularly to a squib actuated single stroke thruster wherein the thruster piston, after actuation, is prevented from being returned to its original position.

Thrusters of the variety which include the mproved thruster as shown and described herein have many uses including bomb, parachute and canopy releases on aircraft, and jettisoning, separating and releasing operations involved in the flights of missiles and space vehicles.

Conventional thrusters are generally comprised of a cylinder, an explodable device fixedly secured within the cylinder at one end thereof, and a slidable piston positioned beside the explodable device within the cylinder.

To initiate the operation of a thruster, which is suitably mounted with respect to the mechanism it is to actuate, the explodable device is first exploded. The explosion is contained within the cylinder and the combustion gases from the explosion build up within the cylinder in the volume between the exploded device and the piston. Because the exploded device is fixedly secured within the cylinder and the piston is slidably secured, the expanding combustion gases slide the piston longitudinally in the cylinder, away from the exploded device. The piston in sliding pushes against and actuates the mechanism to which the thruster is contiguously mounted.

In a number of thruster applications it is of great importance that the piston of the thruster remains in its extended position, resisting any external pressures, forces or vibrations that would tend to cause the piston to experience relaxation, i.e., a partial or complete return to its original position. The prior art thrusters designed to prevent this retractive movement have not proven entirely satisfactory either because they rely primarily upon friction to prevent retractive movement or for other reasons.

It is therefore an object of the present invention to provide a single stroke thruster operable to retain the piston in its extended position after thruster actuation, substantially unrelaxed by external pressures, forces or vibrations which is positively acting so as to overcome the disadvantages mentioned above.

A further object of the present invention is the provision of a single stroke thruster in which the shape of the piston and the ratio of hardness between the piston and the cylinder allows the piston to slide longitudinally within the cylinder upon actuation of the explodable device of the thruster, but will not allow the piston to relax or partially return to its original position.

Another object of the present invention is the provision of a single stroke thruster that is easy to assemble, inexpensive to construct, has a long shelf life and is reliable in use under varied conditions.

These and other objects of the present invention become more apparent and will be more fully developed during the course of the following detailed description and the appended claims.

The invention can best be understood with reference to the accompanying drawings wherein an illustrative embodiment of the invention is shown.

Figure 1:
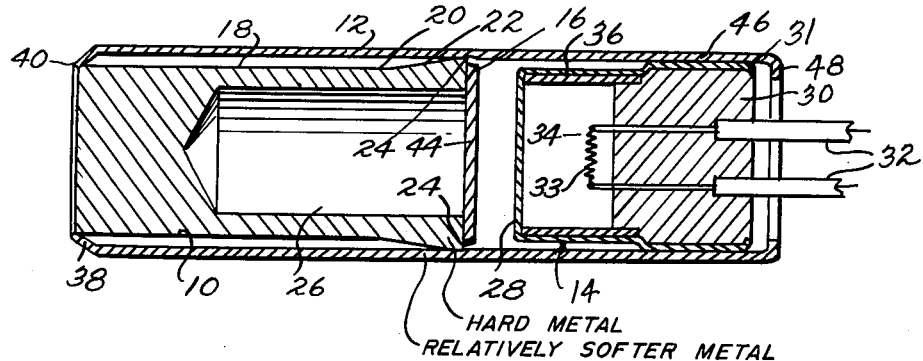
FIGURE 1 is a longitudinal sectional view of a thruster embodying the principles of the present invention, showing the same before actuation.

Referring now in more detail to the drawings, there is shown therein a thruster embodying the principles of the present invention which, in general, includes three main components; namely, a piston 10, a cylinder 12, and an electrically fired squib 14. In a preferred embodiment of the invention the cylinder 12 is composed of a length of an aluminum alloy tube, said cylinder being relatively soft and elastically deformable but having a wall of sufficient thickness to contain the explosion initiated by the squib 14. The piston 10 is generally cylindrical or of circular cross section throughout a greater portion of the length thereof, however end 16 of the piston 10 is of a greater diameter than the piston shank or body 18. The body 18 of the piston 10 is of constant diameter. In a preferred embodiment of the improved thruster of the invention, the outer surface of the piston 10 begins to taper or flare outwardly at a 4° angle 20 and terminates at the piston end 16 where the flaring or outwardly tapering surface 22 of the piston 10 forms an acute angled sharp edge 24 with the larger diameter end 16 of the piston 10. This sharp edge is unbroken and extends completely around the circumference of the piston end 16. The diameter of the sharp edge 24, measured across the piston end 16, is somewhat greater than the interior diameter of the cylinder 12 so that the sharp edge 24 forms a metal to metal seal with the interior surface of the cylinder 12.

The piston 10 is formed from a relatively hard metal such as hardened alloy steel and may have a portion 26 hollowed from the interior thereof reducing the mass of the piston 10 and providing a larger initial gas expansion area. The flared portion extends coaxially with the shank portion of the piston and is preferably formed integrally therewith, but may be formed separately and joined to the shank portion.

The squib 14 is an electrically fired self-contained pyrotechnic part comprising a relatively thin, cup shaped aluminum housing 28, an insulator 30 which is fastened within the open end of the housing 28 by an inward crimp 31 which extends around the open end of the housing 28, lead wires 32 which extend through the insulator 30 to the interior of the housing 28, a high resistance bridge wire 33, extending between the lead wires 32 at the ends thereof, and an explodable ignition bead 34 covering the bridge wire 33 and an annular sleeve member 36.

*Assembly*

In assembling this embodiment of the improved thruster, an inward crimp 38 is formed in one end of the cylinder 12 so that the inner diameter of the end 40 of the thruster cylinder 12 is substantially the same as the outer diameter of the shank or body 18 of the piston 10. The piston 10 is then inserted, body 18 portion first in the yet uncrimped end of the cylinder 12 and advanced longitudinally in the cylinder 12 until the unflared end 42 of the piston 10 is supported by the crimp 38 and is flush with the crimped end of the cylinder 12 as shown in FIGURE 1. Although the diameter of the end 16 of the piston 10 is greater than the interior diameter of the cylinder 12, the piston can be forced longitudinally in the direction of its body 18 because the softer walls of the cylinder 12 are relatively elastically deformable and the flared portion 22 acts as a ramp or inclined plane for easing the advance. A thin disk 44 of easily rupturable material such as cardboard or oaktag, having a diameter that is approximately the same as the interior diameter of the cylinder 12, may be inserted in the cylinder 12 and advanced to cover the rear of the piston 10, thereby preventing any epoxy resin, which is used to secure the squib 14 to the cylinder as hereinafter explained, from adhering to piston 10 during the assembly operation.

The self-contained squib unit is inserted in the cylinder 12 behind the piston 10. The diameter of the housing 28 is slightly less than the interior diameter of the cylinder 12. The squib is rigidly secured in place in the cylinder 12 by epoxy resin 46 or other adhesive means. Finally the end 48 of the cylinder 12 is crimped inwardly to aid the epoxy resin 46 in containing the squib from outward movement upon its actuation.

The annular sleeve member 36 aids in assembling the squib unit but serves no purpose during operation of the thruster.

Operation

Figure 2:
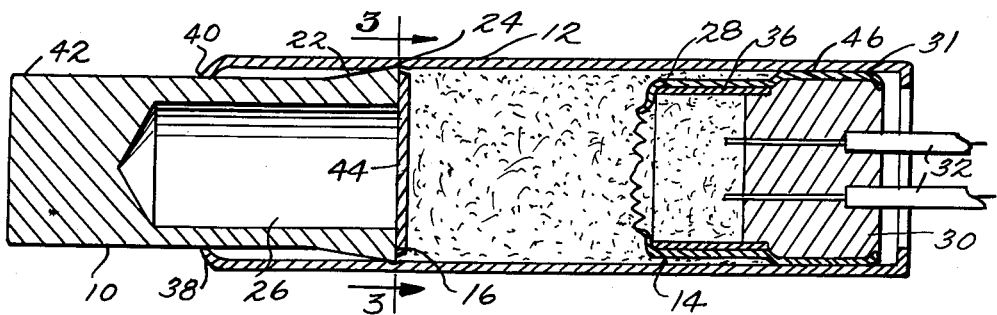
FIGURE 2 is a view similar to FIGURE 1 showing the thruster after actuation.
Figure 3:
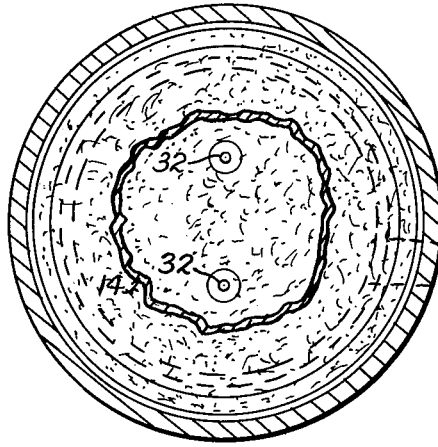
FIGURE 3 is an enlarged sectional view taken along the line 3—3 of FIGURE 2 showing elastic deformation of the cylinder wall at area of contact with sharp edge of piston.

In operation the thruster is secured by suitable fastening means (not shown) so that the piston is in working relationship with respect to any device which it is to actuate. When it is desired to actuate the device, an electric current is sent through the lead wires 32. The current heats the bridge wire 33 and explodes the ignition bead 34. Combustion gases, seeking to expand rupture the thin, single outer housing of the squib, advance into the volume of the cylinder 12 between the squib 14 and the piston 10 and rupture the thin disk 44 advance into the piston hollow portion 26 and act against the rear surfaces of the piston 10 causing the piston to advance longitudinally as shown in FIGURE 2. As the piston 10 is caused to advance by pressure from the expanding gaseous explosion products, the interior wall of the cylinder is required to expand in diameter, within its elastic limits, at the advancing area of contact of the larger diameter sharp edged end of the piston 10 with the interior of the cylinder 12. Thus the inside diameter of the cylinder 12 is smaller than the diameter of the sharped flared end of the piston 10 at all points both in front of and behind the advancing area of contact, but has been elastically deformed to the same diameter at the instantaneous area of contact.

The piston 10 advances until the energy supplied by the expanding gaseous products is expended. The interference fit between the flared portion 22 of the piston 10 and the interior wall of the cylinder 12 prevents the escape of expanding gas past the piston 10 during its travel.

Once the squib has fired and the piston has extended against an opposing load (the device it actuates), it is prevented from relaxing or returning to its original position by the chisel-like action of the sharp edge 24 of the piston 10 and the ratio of the hardness of the piston 10 and the chamber 12. Whereas when the piston 10 was advancing the outwardly tapering surface 22 acted as a ramp or inclined plane to ease the elastic movement of the wall of the relatively soft cylinder 12 over the sharp edge 24 of the relatively hard piston 10, when vibration, external forces or pressure attempt to relax the piston and cause it to retreat in the cylindrical cylinder the relatively hard, sharp edge 24 of the piston 10 cuts into the interior wall of the cylinder 12 and resists the relaxation. This combined resisting effect is much greater than that obtainable from a thruster wherein there is a mere friction fit between a piston and a cylinder. The incomplex nature of the thruster of the invention contributes to its ease of manufacture, inexpensiveness and dependability.

Although a specific embodiment of the improved thruster of this invention has been shown to illustrate the principles of the invention, it should be realized that many modifications of the specific embodiment may be made without departing from the spirit and scope of the following claims.

What is claimed is:

1. A single stroke thruster comprising an elastically deformable cylinder having a piston formed from a material of greater hardness and less elastic deformability than said cylinder and an explodable means mounted therein, said piston being of lesser diameter than the diameter of the interior of said cylinder for a major portion of its length, said piston flaring to an unbroken sharp edge having a diameter greater than the diameter of the interior of said cylinder, said sharp edge of said piston being positioned adjacent said explodable means, said cylinder being of lesser diameter than said sharp edge throughout the length of said cylinder except where said sharp edge contacts said cylinder interior, said harder sharp edge having caused said cylinder to elastically deform in the area of contact therewith, said piston being slidable in said cylinder in a direction away from said explodable device upon the actuation thereof with the flaring surface of said piston acting as an inclined plane to ease relative movement between said piston, sharp edge and said cylinder, said piston being substantially immovable in said cylinder in a direction toward said explodable device with the flaring surface of said piston acting with said piston sharp edge to cut into said cylinder wall preventing relative movement between said piston and said cylinder.

2. A single stroke thruster as in claim 1, said cylinder is formed from an aluminum alloy, said piston is formed from a hardened steel alloy and said explodable means is an electrically fired squib.

3. A single stroke thruster comprising a cylinder, a piston and an explodable piston actuating device said piston being slidably supported wtihin said cylinder by the interior surface thereof, said piston having a shank portion and an outwardly flaring portion extending from said shank portion integrally and coaxially with said shank portion said flaring portion terminating in a sharp edge, said sharp edge having a diameter so much greater than the interior diameter of said cylinder that said cylinder is elastically deformed in the area thereof where said sharp edge contacts the interior surface of said cylinder said explodable piston actuating device being fixedly supported within said cylinder by the interior surface thereof, said outwardly flaring portion of said piston being the closer portion of said piston to said explodable piston actuating device, said cylinder being formed a material of such relative softness and elastic deformability and said piston being formed from a material of such relative hardness that a force upon the end of said piston nearest said outwardly flaring portion by the explosions of said explodable piston actuating device moves said piston longitudinally in said cylinder so that the outwardly flaring portion of said piston acts as an inclined plane easing said elastically deformable interior cylinder surface over said piston sharp edge and such that a force upon the end of said piston nearest said shank portion, which attempts to move said piston longitudinally in the direction of said outwardly flaring portion of said piston, causes said sharp edge of said relatively hard piston to cut into the interior surface of said relatively soft cylinder and prevent the relaxation of said piston.

4. A single stroke thruster as in claim 3 wherein said cylinder is formed from an aluminum alloy and said piston is formed from a hardened steel alloy.

5. A single stroke thruster comprising a relatively soft elastically deformable cylinder, a relatively hard piston and a self-contained squib said squib being fixedly secured within said cylinder and said piston having a shank portion and a flaring portion secured to said shank portion, said flaring portion terminating at an end of said piston in an unbroken sharp edge said unbroken sharp edge having a diameter that is larger than the interior diameter of said cylinder, said piston positioned within said cylinder so the end of said piston which forms sharp edge with said flaring portion is adjacent said squib and said sharp edge contacts a portion of the interior surface of said cylinder, said relatively hard piston elastically deforming said relatively elastically deformable, soft cylinder in the portion of contact thereof thereby forming a fluid tight seal therewith.

6. A single stroke thruster as in claim 5 wherein the relatively elastically deformable, soft cylinder is formed from an aluminum alloy and flaring portion of said relatively hard piston is formed from a hardened steel alloy.

7. A single stroke thruster comprising an elastically deformable cylinder, explosive means and a hardened metallic piston having circular cross section, said piston being tapered throughout a portion of the length thereof and having a first end of a diameter smaller than the interior diameter of said cylinder and a second end of a diameter larger than the interior diameter of said cylinder said tapering portion of said piston abutting said end of larger diameter of said piston forming an unbroken sharp edge therewith, said piston and said explosive means being positioned within said cylinder so that said piston end of larger diameter is adjacent said explosive means, the interior of said cylinder is elastically deformed in the area of contact of said tapering portion and sharp edge of said piston therewith, said piston being slidable in said cylinder only as a force is applied said larger diameter piston end by the actuation of said explosive means with said tapering portion acting as an inclined plane to ease the elastic deformation of said cylinder in the advancing area of contact of said sharp edge and said cylinder.

References Cited in the file of this patent
UNITED STATES PATENTS

| | | |
|---|---|---|
| 2,640,465 | McLeod | June 2, 1953 |
| 2,999,912 | Kincaid | Sept. 12, 1961 |